US008416230B2

(12) United States Patent
Goder

(10) Patent No.: US 8,416,230 B2
(45) Date of Patent: Apr. 9, 2013

(54) EMBEDDED DISPLAY POWER MANAGEMENT

(75) Inventor: Dimitry Goder, San Jose, CA (US)

(73) Assignee: Synaptics Incorporated, Santa Clara, CA (US)

( * ) Notice: Subject to any disclaimer, the term of this patent is extended or adjusted under 35 U.S.C. 154(b) by 593 days.

(21) Appl. No.: 12/623,165

(22) Filed: Nov. 20, 2009

(65) Prior Publication Data

US 2010/0141633 A1 Jun. 10, 2010

Related U.S. Application Data

(60) Provisional application No. 61/120,811, filed on Dec. 8, 2008.

(51) Int. Cl.

| | |
|---|---|
| ***G06F 3/038*** | (2006.01) |
| ***G09G 5/00*** | (2006.01) |
| ***G09G 3/30*** | (2006.01) |

(52) U.S. Cl.
USPC ............................................ 345/212; 345/77

(58) Field of Classification Search ........................ None
See application file for complete search history.

(56) References Cited

U.S. PATENT DOCUMENTS

| | | | | |
|---|---|---|---|---|
| 7,151,346 | B2 | 12/2006 | Sanchez | |
| 7,324,719 | B2 | 1/2008 | Kish, Jr. et al. | |
| 2003/0234762 | A1 | 12/2003 | Nakatsuka et al. | |
| 2009/0109168 | A1 * | 4/2009 | Lee et al. | 345/102 |

OTHER PUBLICATIONS

PCT International Search Report and the Written Opinion mailed Feb. 17, 2010, in related International Application No. PCT/US2009/067208.

VESA DisplayPort Standard, Version 1, Revision 1a, Jan. 11, 2008.

* cited by examiner

*Primary Examiner* — Daniell L Negron
(74) *Attorney, Agent, or Firm* — Haynes and Boone, LLP

(57) ABSTRACT

An integrated circuit is disclosed that includes a display management circuitry configured to control the operation of a display panel in combination with a power management circuitry configured to control the power consumption of a panel backlight.

8 Claims, 5 Drawing Sheets

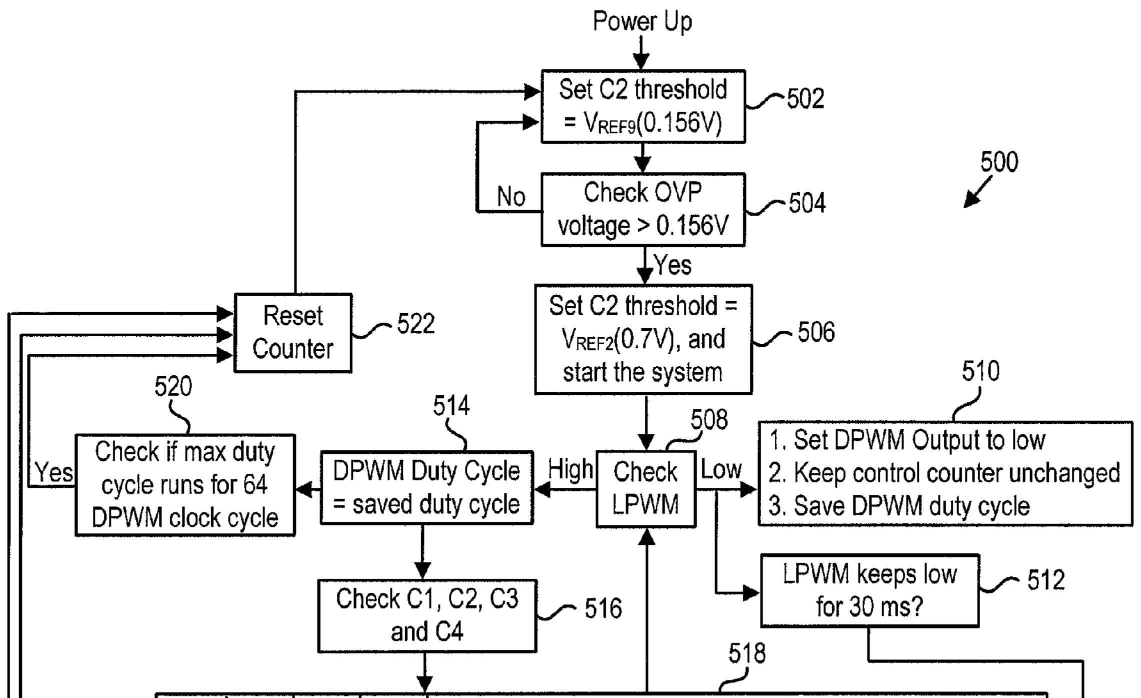

| C1 | C2 | C3 | C4 | DPWM |
|---|---|---|---|---|
| 0 | 0 | 0 | 0 | Every 20μs increase control counter by 1 |
| 0 | 0 | 0 | 1 | Do not exist. Reset counter |
| 0 | 0 | 1 | 0 | Do not exist. Reset counter |
| 0 | 0 | 1 | 1 | Do not exist. Reset counter |
| 0 | 1 | 0 | 0 | Reset counter |
| 0 | 1 | 0 | 1 | Do not exist. Reset counter |
| 0 | 1 | 1 | 0 | Do not exist. Reset counter |
| 0 | 1 | 1 | 1 | Do not exist. Reset counter |
| 1 | 0 | 0 | 0 | Every 20μs increase dither counter by 1 |
| 1 | 0 | 0 | 1 | Do not exist. Reset counter |
| 1 | 0 | 1 | 0 | Every 20μs decrease dither counter by 1 |
| 1 | 0 | 1 | 1 | 1. Disengage DPWM<br>2. Decrement dither counter by 4 every DPWM clock cycle<br>3. Wait until C4 = low |
| 1 | 1 | 0 | 0 | Reset counter |
| 1 | 1 | 0 | 1 | Do not exist. Reset counter |
| 1 | 1 | 1 | 0 | 1. Disengage DPWM<br>2. Decrement dither counter by 4 every DPWM clock cycle<br>3. Wait until C2 = low |
| 1 | 1 | 1 | 1 | 1. Disengage DPWM<br>2. Decrement dither counter by 4 every DPWM clock cycle<br>3. Wait until C2 = low |

Figure 5

EMBEDDED DISPLAY POWER MANAGEMENT

RELATED APPLICATIONS

This application claims the benefit of priority to U.S. Provisional Application No. 61/120,811, filed on Dec. 8, 2008, titled "Embedded Digital Power Management," which is herein incorporated by reference in its entirety.

BACKGROUND

1. Technical Field

The present invention relates to the field of power management and, in particular, to systems and methods for managing power consumption in displays.

2. Discussion of Related Art

Optimizing power consumption in the design of many display panels including, for example, liquid-crystal display ("LCD") panels and the like, has been a long-standing design consideration in the electronics industry. As the costs of producing energy increase and display panel sizes increase, reducing overall power consumption of display panels over time has become especially important. Moreover, reducing overall power consumption in display panels that are battery-powered is an important consideration in achieving longer durations of use between battery recharge cycles or replacements.

In conventional display panels, power consumption of a display panel system is typically managed by an analog power management control circuit that is separate from a discrete mixed-signal main system control circuit used to implement other functionalities of the display panel system. This separately integrated analog power management control circuit, however, often requires additional voltage rails separate from rails utilized by the rest of the display panel system. Moreover, separately integrating the analog power management control circuit increases overall design complexity and cost.

Therefore, it is desirable to develop power management control circuits capable of managing the power consumption of display panel systems that may reduce design complexity and costs.

SUMMARY

Consistent with some embodiments of the present invention, an integrated circuit is disclosed that includes a display management circuitry configured to control the operation of a display panel; and power management circuitry configured to control the power consumption of a panel backlight.

Further embodiments and aspects of the invention are discussed with respect to the following figures, which are incorporated in and constitute a part of this specification.

BRIEF DESCRIPTION OF THE DRAWINGS

FIG. 5 illustrates an embodiment of a power management algorithm that can be executed, for example, on the embodiment of power management circuit shown in FIG. 4.

In the figures, elements having the same designation have the same or similar functions.

DETAILED DESCRIPTION

Figure 1:
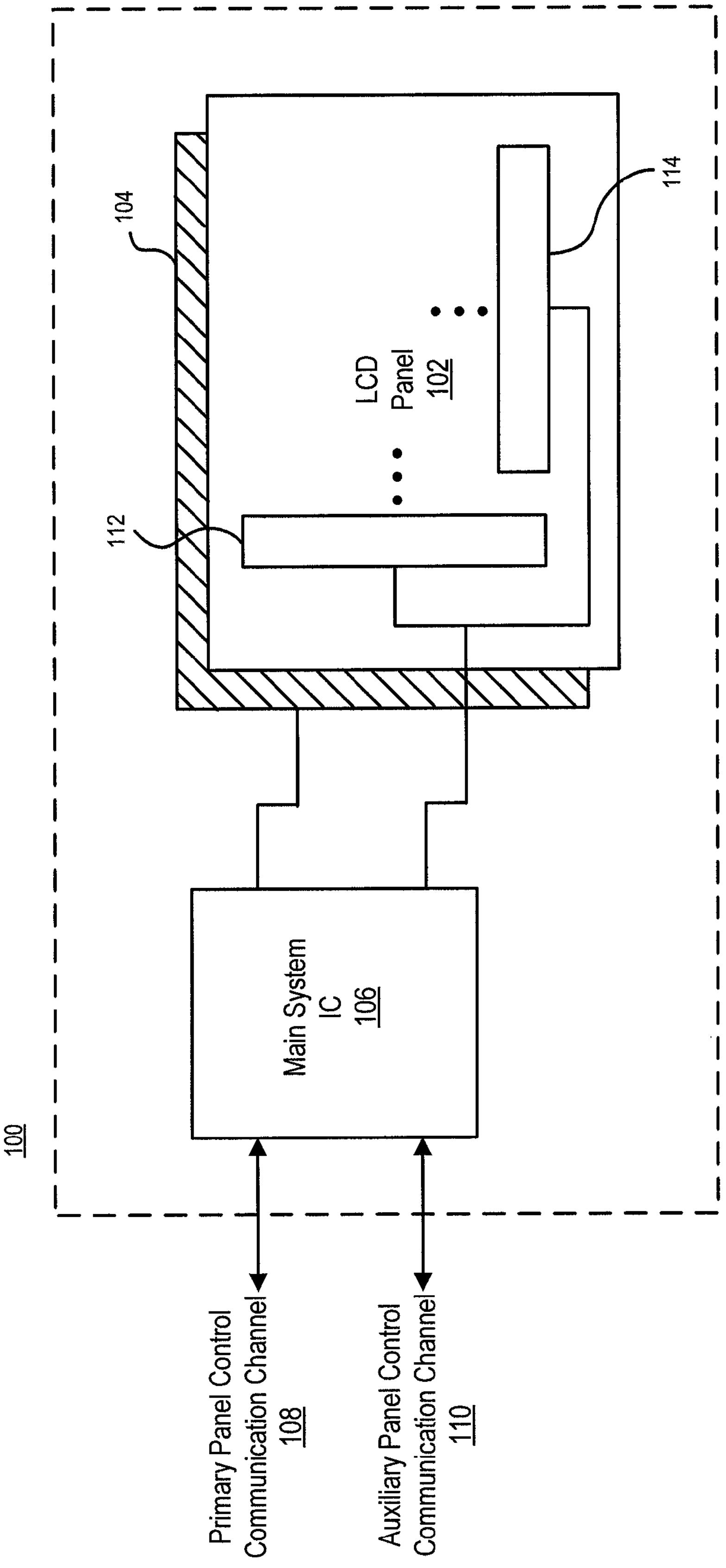
FIG. 1 illustrates a generalized block diagram of a liquid-crystal display ("LCD") panel system that includes a main system integrated circuit ("IC") with power management functionality consistent with embodiments of the present invention.

FIG. 1 illustrates a generalized block diagram of a liquid-crystal display ("LCD") panel system 100 that includes a main system integrated circuit ("IC") 106 with power management functionality consistent with embodiments of the present invention. As shown in FIG. 1, LCD panel system 100 may include a LCD panel 102, LCD panel backlight 104, and a main system IC 106. Main system IC 106 may be coupled to LCD panel 102 and LCD panel backlight 104 and, consistent with embodiments of the invention disclosed herein, may be configured to manage and/or control the operation of LCD panel 102 and/or LCD panel backlight 104.

LCD panel system 100 may be externally controlled via one or more communication channels coupled with main system IC 106 that are configured to provide main system IC 106 with instructions for managing and/or controlling the function of LCD panel 102 and/or LCD panel backlight 104. For example, LCD panel system 100 may be externally controlled via primary panel control communication channel 108 and/or one or more auxiliary panel control communication channel(s) 110.

In some embodiments, primary panel control communication channel 108 and/or auxiliary panel control communication channel(s) 110 may utilize the Video Electronics Standards Association DisplayPort Standard ("DisplayPort"). The DisplayPort standard is described in detail in the VESA DisplayPort Standard, Version 1, Revision 1a, released Jan. 11, 2008, available from the Video Electronics Standard Association ("VESA"), 860 Hillview Court, Suite 150, Milpitas, Calif. 95035, which is herein incorporated by reference in its entirety. For illustrative purposes only, embodiments of the invention that utilize the VESA DisplayPort standard are described herein. One skilled in the art will recognize, however, that embodiments of the present invention can be utilized with other video display communication standards.

LCD panel 102 may include an array of transistors configured to regulate voltage applied across an array of liquid crystal ("LC") pixels. In some embodiments, the array of transistors may comprise thin film transistors ("TFTs"). By modulating the voltage across the LC pixels, the array of transistors can control the amount of light passing through the LC pixels (e.g., the opacity), thereby displaying a particular image. Color may be achieved by including an electronically controlled color filter in LCD panel 102 configured to selectively allow red, green, or blue light to pass through a particular LC pixel.

The array of transistors included in LCD panel 102 may be controlled via a series of row drivers 112 and a series of column drivers 114. The gates of each transistor within a row of the array of transistors may be coupled to a corresponding row driver in the series of row drivers 112 configured to switch the transistors in the particular row "on" or "off." Similarly, the sources of each transistor within a column of the array of transistors may be coupled to a corresponding column driver in the series of column 114 drivers configured to supply a voltage to the transistors in the particular column. By turning a particular row of transistors "on" and supplying a voltage to a particular column of transistors, the opacity of an LC pixel controlled by the transistor at the intersection of the particular row and column may be varied.

Row and column drivers 112, 114 included in LCD panel 102 may be controlled via main system IC 106. Main system IC 106 in turn may be controlled by instructions for managing and/or controlling the row and column drivers of LCD panel 102 received via primary panel control communication channel 108 and/or one or more auxiliary panel control communication channel(s) 110. For example, primary panel control communication channel 108 may utilize the DisplayPort standard to provide main system IC 106 with instructions for managing and/or controlling the function of row and column drivers included in LCD panel 102. The DisplayPort standard utilizes three data links: a main link, an auxiliary channel, and a hot plug detect ("HPD"). In some embodiments, main IC 106 may receive display data via a DisplayPort main link and provide a signal to row and column drivers included in LCD panel 102 configured to control the operation of the array of transistors included in LCD panel 102. Further, in some embodiments, the functionality of main IC 106 may be implemented using a timing controller IC ("TCON") included in LCD panel system 100.

LCD panel backlight 104 may be configured to illuminate LCD panel 102. In this manner, light emanating from LCD panel system 100 may be provided by LCD panel backlight 104 through LCD panel 102. For illustrative purposes only, embodiments of the invention that utilize light-emitting diode ("LED") backlighting technology (e.g., white LED backlighting technology) are described herein. One skilled in the art will recognize, however, that embodiments of the present invention may utilize other backlighting technologies such as, for example, incandescent light bulbs, red-green-blue ("RGB") LCD backlighting using additive color mixing, electroluminescent panels ("ELPs"), cold cathode fluorescent lamps ("CCFLs") and/or hot cathode fluorescent lamps ("HCFLs").

In typical LCD panel systems 100, power consumption by LCD panel backlight 104 may represent a large percentage of the total power consumption of LCD panel system 100. Accordingly, to optimize the overall power consumption of LCD panel system 100, optimizing the power consumption of LCD panel backlight 104 is important. Consistent with embodiments of the invention that utilize LED backlighting technology, power consumption of LCD panel system 100 can be reduced by decreasing the operating current provided to LEDs included in the LCD panel backlight 104 system. In some embodiments, controlling the operating current of the LCD panel backlight 104 may also control the brightness of the LCD panel 102 as perceived by a user of the LCD panel system 100.

Main system IC 106 may implement the above described power management functionality configured to optimize the power consumption of LCD panel backlight 104. In some embodiments, main system IC 106 may be configured to dynamically adjust the operating current of LCD panel backlight 104 based on a corresponding brightness level set by a user of the LCD panel system 100. For example, in embodiments of the invention that utilize the DisplayPort standard, main system IC 106 may receive brightness control information from a user via a DisplayPort auxiliary link and provide a signal to LCD panel backlight 104 configured to control the operating current of the LCD panel backlight in accordance with the brightness control information. In this manner, main system IC 106 may be utilized in some embodiments as the primary gateway for communications between a user and the LCD panel system 100 and be configured to control the operation of LCD panel 102 and LCD panel backlight 104.

Figure 2:
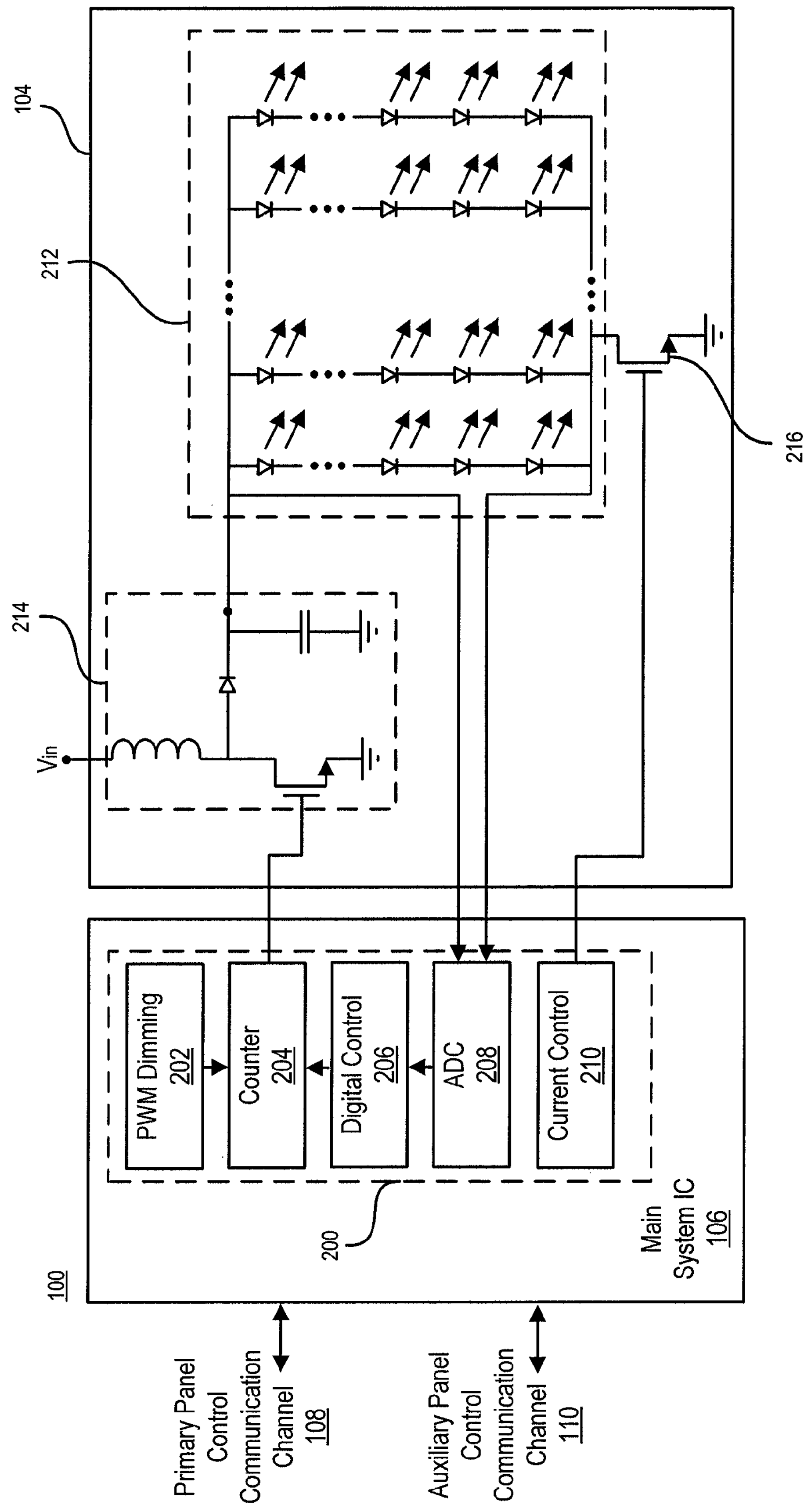
FIG. 2 is a diagram of an exemplary LCD panel system main system IC configured to manage the power consumption of a light-emitting diode ("LED") panel backlighting system consistent with embodiments of the present invention.

FIG. 2 shows a diagram of an exemplary LCD panel system main system IC 106 configured to manage the power consumption of LED panel backlight 104 consistent with embodiments of the present invention. As illustrated in FIG. 2, LED panel backlight 104 power management capabilities may be implemented in main system IC 106 using digital and/or analog power management circuitry 200.

Main system IC 106 may be configured to receive instructions for managing and/or controlling the function of LCD panel 102 and/or LCD panel backlight 104 via one or more communication channels coupled with main system IC 106 (e.g., primary panel control communication channel 108 and/or one or more auxiliary panel control communication channel(s) 110). For example, primary panel control communication channel 108 may utilize the DisplayPort standard to provide main system IC 106 with instructions for managing and/or controlling the power consumption of LCD panel backlight 104. In some embodiments, main system IC 106 may receive power management control instructions via a DisplayPort auxiliary link and provide the received power management control instructions to power management circuitry 200. As discussed above, information regarding the brightness level of the backlight LEDs is transmitted utilizing the Display port auxiliary channel. The brightness level is transmitted as a dimming PWM frequency and duty cycle. PWM dimming 202 in main system IC 106 converts the information received into a pulse with the correct frequency and duration. The pulse can be utilized to turn on and off power management circuit 200 in order to control the brightness of LEDs 212.

Alternatively, in embodiments of the invention that utilize video display communication standards that do not have an auxiliary data link, a secondary panel control communication channel (e.g., auxiliary panel control communication channel 110) may be utilized to provide main system IC with power management control instructions. For example, a secondary panel control communication channel that utilizes the $I^2C$ communication standard may be used to provide main system IC 106 with power management control instructions.

Power management circuitry 200 includes power management circuitry modules 202-210. For example, as illustrated in FIG. 2, power management circuitry 200 may include pulse-width modulation ("PWM") dimming circuitry 202, digital counter circuitry 204, digital control circuitry 206, analog-to-digital converter ("ADC") circuitry 208, and current control circuitry 206. PWM dimming circuitry 202 may be communicatively coupled with digital counter circuitry 204. Similarly, ADC circuitry 208 may be communicatively coupled with digital control circuitry 206, which may be communicatively coupled with digital counter circuitry 204.

LED panel backlight 104 includes LED array 212. As illustrated in FIG. 2, LED array 212 may include a plurality of serially coupled LED segments. The serially coupled LED segments may in turn be coupled in parallel with each other forming LED array 212.

LED array 212 may be driven by voltage switch circuitry 214 and variable current control transistor 216. Voltage switch circuitry 214 may be controlled by digital counter circuitry 204. In some embodiments, voltage switch circuitry 214 may include an n-type metal-oxide-semiconductor ("nMOS") field effect transistor. The gate of the nMOS transistor may be coupled to the output of digital counter circuitry 204. The source of the nMOS transistor may be coupled to ground. The drain of the nMOS transistor may be coupled to an input voltage source $V_{in}$ across an inductor included in voltage switch circuitry 214. Additionally, the source of the nMOS transistor may also be coupled to the anode terminal of a diode included in voltage switch circuitry 214. The cathode terminal of the diode may be coupled to the top terminal node of the serially coupled LED segments of LED array 212. Further, a capacitor included in voltage switch circuitry 214 may be coupled between the cathode terminal of the diode and ground.

PWM dimming circuitry 202 provides digital counter circuitry 204 with PWM dimming control information. Particularly, PWM dimming circuitry 202 may be capable of providing PWM dimming control information for adjusting the brightness of LED array 212 by utilizing pulse-width modulation methods. For example, utilizing pulse-width modulation methods, the operating current the LEDs included in LED array 212 may be set to their nominal current level and be driven by a modulated driving signal that may be varied to adjust the perceivable brightness of LED array 212. In some embodiments, the modulating driving signal may be provided by digital counter circuitry 204 based on PWM dimming control information provided by PWM dimming circuitry 202.

ADC circuitry 208 is configured to receive one or more analog signals from LED array 212 and convert the analog signal[s] into one or more digital signal[s] to be utilized by main system IC 106. For example, as illustrated in FIG. 2, ADC circuitry 202 may receive one or more analog signals from the circuit nodes corresponding to one and/or both terminating nodes of the serially coupled LED segments included in LED array 212, and convert the analog signal and/or signals into one or more corresponding digital signals. Digital control circuitry 206 may be used to convert the one or more digital signals provided by ADC circuitry 208 into one or more control signals provided to digital counter 204. In some embodiments, the one or more digital signals may relate to the pulse-width[s] of the one or more analog signals received by ADC circuitry 208, and digital control circuitry 206 may provide digital counter 204 with control information related to the received analog pulse-width[s].

As illustrated in FIG. 2, in some embodiments, variable current control transistor 216 may be an nMOS transistor. The drain of the variable current control transistor 216 may be coupled to the bottom terminating node of the serially coupled LED segments of LED array 212. The source of the variable current control transistor 216 may be coupled to ground. Finally, the gate of the variable current control transistor 216 may be coupled to current control circuitry 210 included in power management circuitry 200 of main system IC 106. In some embodiments, each serially coupled LED segment of LED array 212 may include a dedicated current control transistor 216.

The operating current of the LEDs included in LED array 212 may be based on a current control signal provided by current control circuitry 210 to the gate of variable current control transistors 216. In some embodiments, this operating current may be the nominal operating current of the LEDs included in LED array 212. Further, in some embodiments, this operating current may be varied by adjusting the current control signal to variably change the perceivable brightness of LEDs included in LED array 212. In some embodiments, this variable brightness control may be utilized in conjunction with PWM dimming methods to optimize the power consumption of LED array 212.

Figure 3:
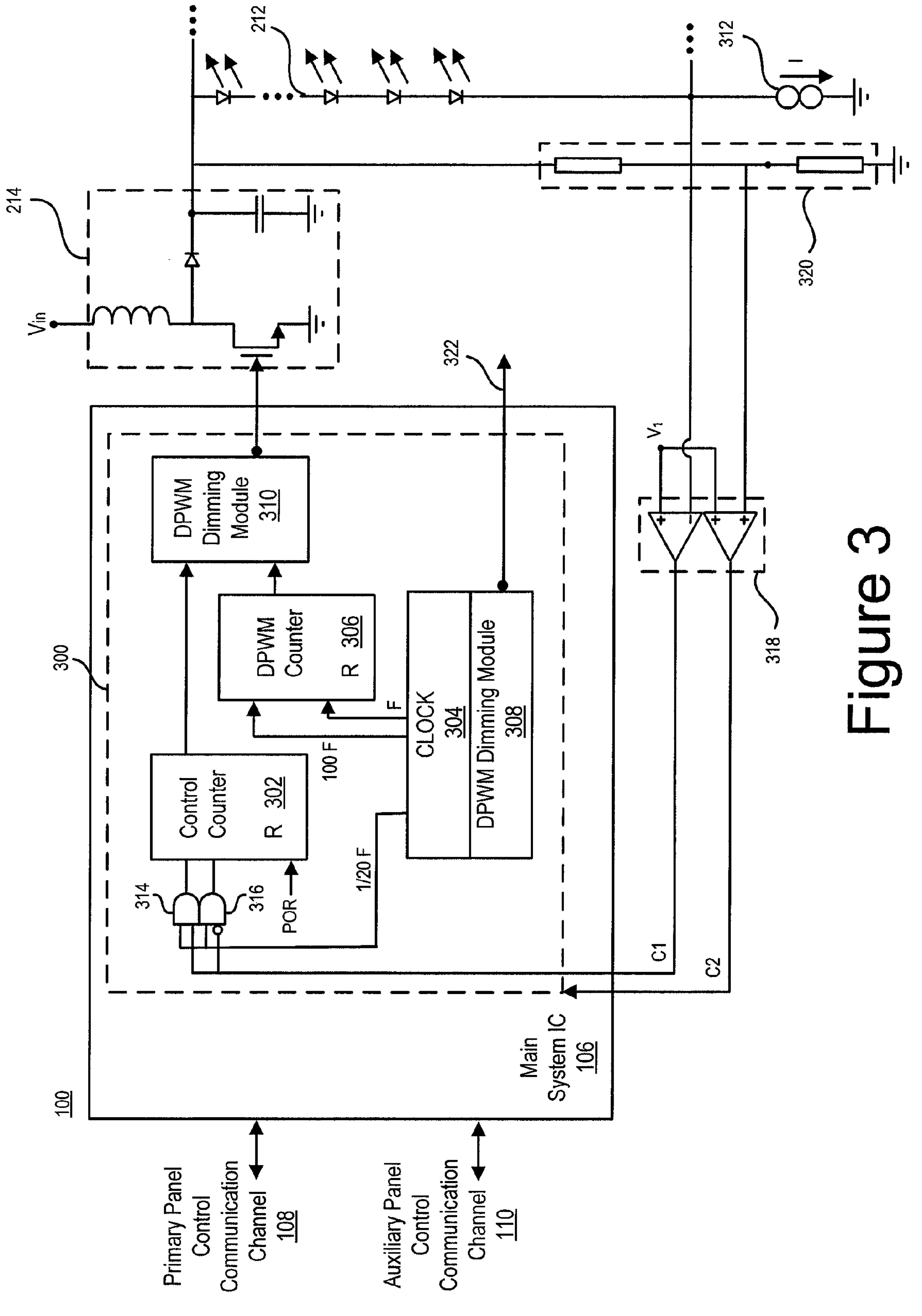
FIG. 3 is another diagram of an exemplary LCD panel system main system IC configured to manage the power consumption of an LED panel backlighting system consistent with embodiments of the present invention.

FIG. 3 shows a schematic of an exemplary LCD panel system main system IC 106 configured to manage the power consumption of an LED panel backlight 104 consistent with embodiments of the present invention. As illustrated in FIG. 3, LED panel backlight 104 power management capabilities may be implemented in main system IC 106 using digitally implemented power management circuitry 300. For purposes of illustration, LED array 212 of LED panel backlight 104 illustrated in FIG. 3 includes one serially coupled LED segment. One skilled in the art will appreciate, however, that consistent with embodiments of the present invention, LED array 212 illustrated in FIG. 3 may also include a plurality of serially coupled LED segments that may in turn be coupled in parallel with each other, as illustrated in FIG. 2.

Similar to the embodiments illustrated in FIG. 2, main system IC 106 may be configured to receive instructions for managing and/or controlling the function of LCD panel 102 and/or LCD panel backlight 300 via one or more communication channels coupled with main system IC 106 (e.g., primary panel control communication channel 108 and/or one or more auxiliary panel control communication channel(s) 110). For example, primary panel control communication channel 108 may utilize the DisplayPort standard to provide main system IC 106 with instructions for managing and/or controlling the power consumption of LCD panel backlight 104. In some embodiments, main system IC 106 may receive power management control instructions via a DisplayPort auxiliary link and provide the received power management control instructions to digitally implemented power management circuitry 300. Alternatively, in embodiments of the invention that utilize video display communication standards that do not have an auxiliary data link, a secondary panel control communication channel (e.g., auxiliary panel control communication channel 110) may be utilized to provide main system IC with power management control instructions. For example, a secondary panel control communication channel that utilizes the $I^2C$ communication standard may be used to provide main system IC 106 with power management control instructions.

In some embodiments, digitally implemented power management circuitry 300 of main system IC 106 may include control counter 302, clock circuitry 304, digitally adjusted pulse-width modulation ("DPWM") counter 306, low-frequency pulse-width modulation ("LPWM") dimming module 308, and DPWM dimming module 310.

As illustrated in FIG. 3, in some embodiments, LED array 212 may be driven by voltage switch circuitry 214 and current source 312. Voltage switch circuitry 214 in turn may be controlled by digitally implemented power management circuitry 300 of main system IC 106. In some embodiments, voltage switch circuitry 214 may include an n-MOS transistor. The gate of the n-MOS transistor may be coupled to an output of digital implemented power management circuitry 300. The source of the nMOS transistor may be coupled to ground. The drain of the nMOS transistor may be coupled to an input voltage source $V_{in}$ across an inductor included in voltage switch circuitry 214. Additionally, the source of the nMOS transistor may also be coupled to the anode terminal of a diode included in voltage switch circuitry 214. The cathode terminal of the diode may be coupled to the top terminal node of the serially coupled LED segments of LED array 212. Further, a capacitor included in voltage switch circuitry 214 may be coupled between the cathode terminal of the diode and ground.

Voltage switch circuitry 214 may be driven by DPWM dimming module 310 of digitally implemented power management circuitry 300. An output control signal provided by DPWM dimming module 310 may be provided to the gate of the n-MOS transistor of voltage switch circuitry 214 that may be capable of providing PWM dimming control for adjusting the brightness of LED array using pulse-width modulation methods. Particularly, the output signal of DPWM dimming module 310 may drive voltage switch circuitry 214 to generate a modulated voltage signal to the top terminal node of the serially coupled LED segments of LED array 212 that may be varied to adjust the perceivable brightness of LED array 212.

DPWM dimming module 310 may generate the output signal provided to voltage switch circuitry 214 based on a counter signal received from DPWM counter 306 and a counter signal received from control counter 302. In some embodiments, the DPWM counter 306 may be configured to provide DPWM dimming module 310 a counter signal that counts to a fixed number then resets, the fixed number being determined by the differential frequency between two clock signals provided to DPWM counter 310. Further, in some embodiments, control counter 302 may provide DPWM dimming module 310 a counter signal that increments or decrements based, at least in part, on the voltages at the top and/or bottom terminal nodes of the serially coupled LED segments of LED array 212. In some embodiments, this counter signal may be related to a measured duty cycle of a signal driving the LED segments of LED array 212.

Clock circuitry 304 included in digital implemented power management circuitry 300 may generate one or more clock signals and provide the clock signals to one or more of the digitally implemented power management circuitry modules 302-310. For example, clock circuitry 304 may generate a first clock signal having a frequency F and provide the first clock signal to the reset terminal of DPWM counter 306, generate a second clock signal having a frequency of 100 F and provide the second clock signal to the input terminal of DPWM counter 306, generate a third clock signal having a frequency of 1/20 F and provide the third clock signal to one of the non-inverting input terminals of both AND gates 314 and 316 included in digitally implemented power management circuitry 300, and generate a fourth clock signal having a frequency of 1/100 F and provide the fourth clock signal to LPWM dimming module 308. Clock circuitry 304 may, however, generate one or more clock signals having differing relative frequencies than the frequencies illustrated in FIG. 3.

As discussed above, in some embodiments, control counter 302 may provide DPWM dimming module 310 a counter signal that increments or decrements based, at least in part, on the voltages at the top and/or bottom terminal nodes of the serially coupled LED segments of LED array 212. In some embodiments, one or more 1-bit DACs (e.g., DAC 318 in FIG. 3), may be used to generate digital signals C1 and/or C2 based on respective voltages at the top and/or bottom terminal nodes of the serially coupled LED segments of LED array 212. As illustrated in FIG. 3, DAC 318 may be implemented using one or more comparators. The positive terminals of the one or more comparators may be coupled to a reference voltage $V_T$. The negative terminals of the one or more comparators may be coupled either to the top or to the bottom terminal nodes of the serially coupled LED segments of LED array 212 to respectively generate digital signals C1 and/or C2. In some embodiments, over voltage protection circuitry 320 may be used to scale down a high power voltage signal at the top terminal node of the serially coupled LED segments of LED array 212 and provide the negative input of one of the comparators of DAC 318 with this scaled down voltage. In some embodiments, over voltage protection circuitry 320 may be implemented using a voltage divider circuit.

As described above, clock circuitry 304 may generate a third clock signal having a frequency of 1/20 F and provide the third clock signal to one of the non-inverting input terminals of both AND gates 314 and 316 included in digitally implemented power management circuitry 300. Similarly, digital signal C1 may be provided another non-inverting input of AND gate 314, the output of which may be coupled with an incrementing input terminal of control counter 302. Digital signal C1 may also be provided to an inverting input of AND gate 316, the output of which may be coupled with a decrementing input terminal of control counter 302. A power-on reset signal ("POR") may be provided to the reset terminal of control counter 302. The output counter signal of control counter 302 may be dependent on the signals received at its incrementing and/or decrementing input terminals and its reset terminal and, in some embodiments, may be related to a measured duty cycle of a signal driving the LED segments of LED array 212. Digital signal C2 may be similarly provided to the incrementing decrementing terminals of another control counter included in power management circuitry for use in generating a second control signal related to the duty cycle of digital signal C2.

Current source 312 may drive the LEDs included in LED array 212 at their nominal operating current. In some embodiments, current source 312 may drive the LEDs included in LED array at different operating currents. In some embodiments, the operating current of the LED may be set based on a current control signal received by main system IC 106 via primary panel control communication channel 108 and/or auxiliary panel control communication channel 110. LPWM dimming module 308 may include circuitry configured to drive the LED segments of LED array 212 with a LPWM driving signal 322.

Figure 4:
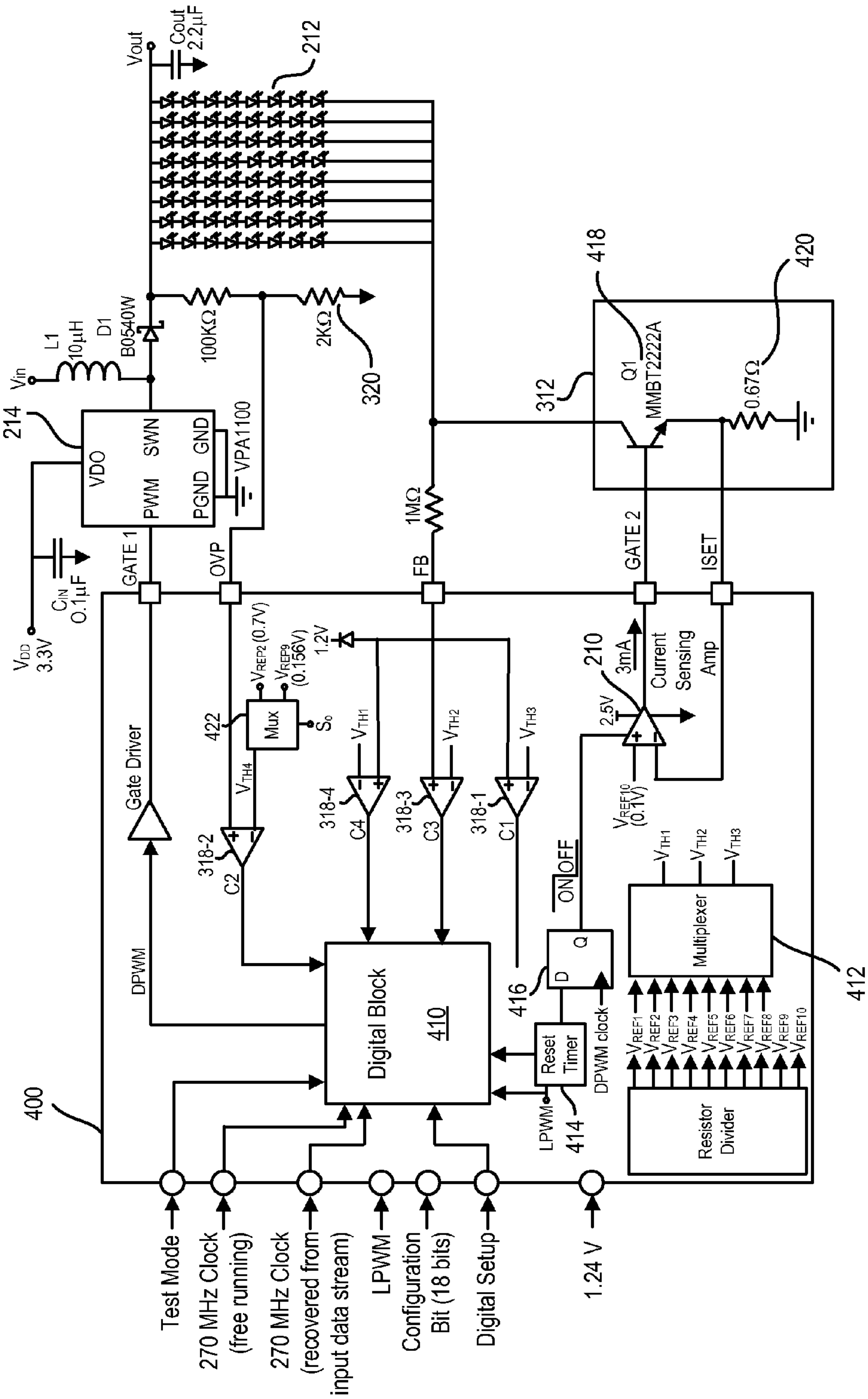
FIG. 4 illustrates an embodiment of a power management circuit according to some embodiments of the present invention.

FIG. 4 illustrates an LED driver 400 according to some embodiments of the present invention. As shown in FIG. 4, LED driver 400 includes a digital block 410, a threshold generator 412, and a reset timer 414. A/D converter 318 includes converters 318-1, 318-2, 318-3, and 318-4, which in turn generate digital values C1, C2, C3, and C4, respectively. As discussed with respect to FIG. 3, Digital block 410 includes control counter 302, DPWM counter 306, DPWM dimming module 310, clock 304, and LPWM dimming module 308.

As shown in FIG. 4, digital setup data, power, clocks, and a LPWM signal are input to digital block 410. A DPWM signal is output from digital block 410 and provided to switch circuitry 214. In some embodiments, switch circuitry 214 can be IDT chip VPA1100.

As shown in FIG. 4, digital value C1 is determined in converter 318-1 by comparing the voltage at current source 312 with a threshold voltage $V_{TH3}$. Digital value C2 is determined in converter 318-2 by comparing a voltage generated by voltage divider 320 with a threshold value $V_{TH4}$. Digital value C3 is determined in converter 318-3 by comparing the voltage at current source 312 with a threshold voltage $V_{TH2}$. Digital value C4 is determined in converter 318-4 by comparing the voltage at current source 312 with a threshold voltage $V_{TH1}$. Values C1, C2, C3, and C4 are presented to digital block 410.

As shown in FIG. 4, threshold values $V_{TH1}$, $V_{TH2}$, and $V_{TH3}$ are chosen in select circuitry 412. Threshold value $V_{TH4}$ is selected in multiplexer 422 from values generated in select circuitry 412. As shown in FIG. 4, select circuitry 412 includes a resistive divider that provides a series of voltages that can be chosen in a multiplexer. Although any number of reference voltages may be generated, in some embodiments, ten reference voltages are generated in select circuitry 412 with eight voltages from which to choose $V_{TH1}$, $V_{TH2}$, and $V_{TH3}$ while $V_{TH4}$ is chosen from two of the voltages. In some embodiments, the ten reference voltages generated by a resistive divider coupled between a 1.24V source and ground include $V_{REF1}$=0.75V, $V_{REF2}$=0.70V, $V_{REF3}$=0.65V, $V_{REF4}$=0.60V, $V_{REF5}$=0.55V, $V_{REF6}$=0.50V, $V_{REF7}$=0.45V, $V_{REF8}$=0.40V, $V_{REF9}$=0.156V, and $V_{REF10}$=0.10V. As shown in FIG. 4, $V_{TH1}$, $V_{TH2}$, and $V_{TH3}$ are chosen from $V_{REF1}$ through $V_{REF8}$ while $V_{TH4}$ is chosen between $V_{REF2}$ and $V_{REF9}$.

As shown in FIG. 4, C1 indicates whether or not the voltage at current source 312 is above or below voltage $V_{TH3}$. Similarly, C3 indicates whether the voltage at current source 312 is above or below voltage $V_{TH2}$ and C4 indicates whether the voltage at current source 312 is above or below voltage $V_{TH1}$. Further, C2 indicates whether the voltage at resistive divider 320, indicating an overvoltage, is above or below the voltage $V_{TH4}$.

Further, current source 312 may be controlled by a current sensing amp 210. Current sensing amp 210 compares the voltage across a resistive sensor 420 in current source 312 with a threshold voltage, in some embodiments $V_{REF10}$ described above. In some embodiments, a transistor 418 in current source 312 controls the current flowing through current source 312. In some embodiments, current sensing amp 210 is enabled by flip-flop 416 that is clocked by a DPWM signal and reset with a reset timer 414.

FIG. 5 illustrates a flow chart for an algorithm 500 that can be operated on LED driver 400 as shown in FIG. 4. Upon power-up, digital block 410 of LED driver 400 enters step 502 where threshold value $V_{TH4}$ is set to a lower voltage, in this case $V_{REF9}$, by setting signal $S_0$ to multiplexer 422. In step 504, the signal OVP is checked against $V_{TH4}$ in digital to analog converter 318-2 to indicate whether the input voltage is greater than the lower threshold. If it is not, the digital block 410 returns to step 502. If it is, then digital block 410 proceeds to step 506 and sets signal $S_0$ to multiplexer 422 in order to choose the higher voltage, $V_{REF2}$, in multiplexer 422. Digital block 506 then proceeds to step 508.

In step 508, the LPWM signal is checked. If LPWM is low, then digital block 506 proceeds to step 510 where the DPWM signal is set to low and the current DPWM duty cycle is stored. In step 512, if the signal LPWM remains low for longer than a preset period of time, for example 30 ms, then digital block 506 proceeds to reset counter 522. In reset counter 522, control counter 306 as shown in FIG. 3 is reset. From reset counter 522, digital block 506 then proceeds to step 502 to restart LED driver 400.

If LPWM is high in step 508, then digital block 506 proceeds to step 514 where the duty cycle of the DPWM signal is set to the saved, duty cycle. If the maximum duty cycle has been run for a number of DPWM clock cycles, for example 64 cycles as indicated in step 520, then digital block 506 proceeds to reset counter 522, which operates as described above.

Provided the condition of step 520 is not fulfilled, then digital block 506 proceeds to step 516 where the parameters C1, C2, C3, and C4 are obtained. From step 526, digital block 506 proceeds to step 518 and performs the function indicated for combination of C1, C2, C3, and C4. As shown in FIG. 5, if C1, C2, C3, and C4 are low, indicating that the feed-back voltage FB, which is the voltage at the current source, is below all of the threshold voltages, then control counter 302 is incremented on preset times until the values C1, C2, C3, and C4 change. If C1, C2, C3, and C4 are (0,1,0,0), respectively, indicating an overvoltage situation, then digital block 410 proceeds to reset counter 522. If C1 goes high, indicating that FB has gone above $V_{TH3}$, then a dither counter is increased by 1 until the values of C1, C2, C3, and C4 change. If the value of FB goes above VTH2, sending C3 high, then the dither is decreased. In some embodiments, under this condition, no change is provided. If C1, C3, and C4 go high, then DPWM is disengaged and the dither is decremented until C4 goes low. IF C1 and C2 go high, then digital block 410 goes to reset counter 522. If C1, C2, and C3 are high, then DPWM is disengaged and the dither is decreased until C2 goes low, regardless of the value of C4. Under all other conditions, digital block 410 goes to reset counter step 522.

Accordingly, as shown in FIGS. 4 and 5, the parameters of the DPWM signal are set within guidelines set by the threshold values utilizing the OVP and FB signals. Digital block 410 is capable of monitoring the relationships between the threshold values the OVP and FB signals through digitized values.

Embodiments of the invention described herein may be implemented using digital and/or analog circuitry. Further, in some embodiments, circuits (e.g., main system IC), counters, and/or modules disclosed herein may be implemented using a field-programmable gate array ("FPGA"). In some embodiments, main system IC may be implemented in an application-specific integrated circuit ("ASIC").

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

What is claimed is:

1. An integrated circuit comprising:

display management circuitry configured to control the operation of a display panel; and power management circuitry configured to control the power consumption of a panel backlight from an overvoltage and a feedback voltage measured from the panel backlight, the feedback voltage and the overvoltage being determined by voltages on opposite sides of the panel backlight, and wherein the panel backlight is a light-emitting diode ("LED") backlight, wherein:

the feedback voltage and a first threshold voltage is compared in a comparator to generate a first digital signal and the overvoltage is compared with a second threshold voltage to generate a second digital signal;

the power management circuitry comprises a digital block receiving the first digital signal and the second digital signal; and a dither is adjusted in response to the first digital signal.

2. The integrated circuit of claim 1, wherein the display panel is a liquid-crystal display ("LCD").

3. The integrated circuit of claim 1, wherein controlling the power consumption of the panel backlight includes controlling the brightness level of the panel backlight.

4. The integrated circuit of claim 3, wherein the power management circuitry is configured to control the power consumption of the panel backlight based on user input received by the integrated circuit.

5. The integrated circuit of claim 1, wherein the digital block turns a digital pulsed-width modulated signal off if the second digital signal indicates an overvoltage.

6. The integrated circuit of claim 1, further including a third digital signal and a fourth digital signal generated by comparing the feedback voltage with a third threshold and a fourth threshold, respectively.

7. The integrated circuit of claim 6, wherein the digital block fully controls duration and duty cycle of a digital pulsed-width modulation signal based on the first digital signal, the second digital signal, the third digital signal, and the fourth digital signal.

8. A method of controlling power to a display, comprising:

starting power to a LED array;

checking a low-frequency pulse-width modulation (LPWM) signal and, on a high condition, compare a feedback voltage with a first threshold voltage to provide a first digital signal, compare an overvoltage signal with a second threshold voltage to provide a second digital signal, and adjust a duty cycle and a dither for a digital pulsed width modulation (DPWM) signal in response to the first digital signal and the second digital signal; and on a low condition, setting the DPWM signal to low, and saving the DPWM duty cycle.

* * * * *